United States Patent [19]

Collins, III et al.

[11] 4,157,247
[45] Jun. 5, 1979

[54] CORROSION CONTROL PROCESS

[75] Inventors: Robert H. Collins, III, Beverly Hills, Calif.; Donald L. Love, Tulsa, Okla.

[73] Assignee: Reserve Synthetic Fuels, Inc., Signal Hill, Calif.; a part interest

[21] Appl. No.: 847,092

[22] Filed: Oct. 31, 1977

[51] Int. Cl.² .............................................. B01D 53/04
[52] U.S. Cl. ............................................ 55/31; 55/33; 55/62; 55/71; 55/74
[58] Field of Search ....................... 55/29–35, 55/62, 71, 74, 75

[56] References Cited

U.S. PATENT DOCUMENTS

| Re. 18,563 | 8/1932 | Cooper et al. ................ 55/31 X |
| 1,942,072 | 1/1934 | Sperr, Jr. .................... 48/197 |
| 2,225,959 | 12/1940 | Miller ........................ 55/30 |
| 2,804,940 | 9/1957 | Hutchinson ................... 55/33 |
| 2,827,129 | 3/1958 | Gould ........................ 55/71 X |
| 2,995,203 | 8/1961 | Maurer ....................... 55/30 |
| 3,001,607 | 9/1961 | Eng et al. ................... 55/71 X |
| 3,039,251 | 6/1962 | Kamlet ....................... 55/29 |
| 3,116,987 | 1/1964 | Honerkamp et al. ............. 55/31 |
| 3,273,312 | 9/1966 | Zirngibil et al. ............. 55/31 |
| 3,343,916 | 9/1967 | Cahn et al. .................. 55/31 X |
| 3,398,508 | 8/1968 | Hart ......................... 55/71 |
| 3,488,923 | 1/1970 | Hutchinson ................... 55/71 |
| 3,664,091 | 5/1972 | Hegwer ....................... 55/29 |
| 3,676,981 | 7/1972 | Afdahl et al. ................ 55/30 |
| 3,720,041 | 3/1973 | Alvarez et al. ............... 55/71 X |
| 3,736,725 | 6/1973 | Alleman et al. ............... 55/32 |
| 3,789,580 | 2/1974 | Allemang et al. .............. 55/71 |
| 3,948,622 | 4/1976 | Tsao ......................... 55/32 |
| 4,000,990 | 1/1977 | Bingham ...................... 55/30 |

Primary Examiner—Robert H. Spitzer
Attorney, Agent, or Firm—Gordon L. Peterson

[57] ABSTRACT

This process removes water and at least some of an impurity from a fluid stream which contains a product fluid. The impurity includes a halogenated hydrocarbon. The process includes removing substantially all of the water from the fluid stream to provide a substantially dehydrated fluid stream and introducing the dehydrated fluid stream to an adsorption zone to adsorb the halogenated hydrocarbon from the dehydrated fluid stream to provide the product fluid. The adsorption zone is regenerated by passing a hot regeneration gas through it to remove the halogenated hydrocarbon. The heat from the hot regeneration gas cracks the halogenated hydrocarbon to provide a gaseous impurity component containing hydrogen and at least one halogen. The gaseous impurity component is removed from the regeneration gas at a location outside the adsorption zone.

17 Claims, 2 Drawing Figures

CORROSION CONTROL PROCESS

BACKGROUND OF THE INVENTION

Decomposition of the refuse within a sanitary landfill produces landfill gas which contains methane and impurities. For example, the impurities may include carbon dioxide, water and various hydrocarbons.

Although the concentration of methane in landfill gas varies, methane may comprise about 50 percent by volume of the landfill gas. In some instances, the landfill gas is used without removal of the impurities, and in other instances, the concentration of the methane is increased by removing some, or substantially all, of the impurities.

Impurities can advantageously be removed in an adsorption process, and one such process is disclosed in Bingham U.S. Pat. No. 4,000,990. In the Bingham process, landfill gas is first passed through a pretreating adsorption zone where the water in th gas is adsorbed. Subsequently, the landfill gas is passed through an additional adsorption zone to remove substantially all of the other impurities. After the adsorbent material in the pretreating zone becomes saturated with impurity, the saturated zone is thermally regenerated by passing a hot regeneration gas through it. This removes the impurity from the pretreating adsorption zone and makes it ready for subsequent use on stream.

The process described in the Bingham patent works very well to provide product fluid having an extremely high concentration of methane. However, corrosion problems developed in the pretreating adsorption zones and in the thermal regeneration system for the pretreating adsorption zones. Although the existence of the corrosion was self-evident, the cause of the corrosion was not apparent and was difficult to ascertain.

SUMMARY OF THE INVENTION

After considerable study, we discovered the cause of the corrosion. Landfill gas contains chlorinated hydrocarbons in trace amounts, such as 0.02% to 0.03% by volume. These chlorinated hydrocarbons are adsorbed in the adsorbent material of the pretreating zone. During thermal regeneration, the heat from the hot regeneration gas cracks at least some of the adsorbed chlorinated hydrocarbons to produce hydrogen chloride gas. The hydrogen chloride gas and the water adsorbed in the pretreating zones mix to form hydrochloric acid which is very corrosive to the regeneration circuit and components.

This corrosion problem is solved by the present invention. Although the solution to this problem is particularly applicable to a landfill gas adsorption process, it is equally applicable to other fluids containing water and the potential for creating a troublesome acid gaseous impurity component.

To eliminate the formation of a corrosive acid, the present invention provides for removal of the water from the fluid stream to provide a dehydrated fluid stream upstream from the adsorption zone. Sufficient water should be removed at this stage so that substantially no water is adsorbed on the adsorbent material of the adsorption zone. Preferably, substantially all of the water is removed from the fluid stream. Thus, when the dehydrated fluid stream passes through the adsorption zone, substantially no water is retained in the adsorbent material. As water is essential to the formation of a corrosive acid and because there is no water in the adsorption zone, no acid is formed.

Water removal can be accomplished in virtually any way which provides the requisite dryness of the fluid stream. However, if an adsorbent is used to obtain dehydration and if that adsorbent also adsorbs any chlorinated hydrocarbons or other component capable of forming an acid upon contact with water the acid formation problem described above will occur upon thermal regeneration of the adsorbent. For this reason, it is preferred to remove the water without using an adsorbent. A preferred way to remove the water is with a glycol dehydrator.

The dehydrated fluid stream is introduced to an adsorption zone and at least some of the impurity from the fluid stream is adsorbed. In the case of a typical landfill gas, the adsorbed impurity includes chlorinated hydrocarbons. When the adsorption zone approaches saturation with the impurity, the introduction of the dehydrated fluid stream into the adsorption zone is terminated.

The saturated adsorption zone is then taken off stream and it is regenerated by passing a hot regeneration gas through the adsorption zone. This removes the adsorbed impurity. The temperature of the regeneration gas that is required to thermally regenerate the adsorbent cracks the chlorinated hydrocarbon to provide hydrogen chloride gas.

It is necessary to remove the hydrogen chloride gas before the regeneration gas is again passed through an adsorption zone because the hydrogen chloride gas would be adsorbed in the adsorption zone and ultimately destroy the effectiveness of the bed of adsorbent. Thus, in a closed-loop regeneration system, the hydrogen chloride gas must be removed before the regeneration fluid is reused in the adsorption zone. Also, in an open-loop system where the regeneration fluid includes product fluid, it is necessary to remove the hydrogen chloride gas before the fluid stream is further purified with an adsorption process. The hydrogen chloride removal should take place out of the adsorption zone.

Various techniques can be used to remove the hydrogen chloride gas. However, it is preferred to contact the regeneration gas with a caustic to neutralize the acid gas. Preferably, an aqueous caustic solution is mixed with the hydrogen chloride gas in a caustic wash tower to form sodium chloride which can be easily drained from the caustic wash tower. The use of the aqueous solution adds water to the regeneration gas, and the water should be removed before the regeneration gas is utilized. Water removal can be carried out in different ways, including the use of a glycol dehydrator to provide regeneration gas.

In an open-loop system, the regeneration gas may comprise a portion of the dehydrated fluid stream. In this event, the regeneration gas, following hydrogen chloride removal and dehydration, is introduced to an adsorption zone for impurity removal. In a closed-loop system, the dehydrated regeneration gas is reheated for subsequent use in thermal regeneration.

The concepts of this invention are applicable to any number of adsorption zones regardless of the manner in which the adsorption zones may be sequenced between on-stream operation and desorption. If desired, the product fluid discharged from the adsorption zone can be further purified by passing it through one or more subsequent adsorption stages to remove additional impurities.

It should be understood that this invention is not limited to a fluid stream containing chlorinated hydrocarbons but is equally applicable to a fluid stream containing water, a product fluid and an impurity which includes a halogenated hydrocarbon. A halogenated hydrocarbon is a compound containing a hydrocarbon and one or more of the halogens. For example, the halogenated hydrocarbon may include a chlorinated hydrocarbon, such as methylene chloride, trichloroethylene and perchloroethylene. Alternatively, the halogenated hydrocarbon may include fluorinated hydrocarbons or both fluorinated and chlorinated hydrocarbons. Fluorinated hydrocarbons may occur in landfills as a result of dumping of industrial wastes or refrigerants. For example, refrigerants, such as trichloromonofluoromethane and trichlorotrifluoroethane may be found in landfills. When a halogenated hydrocarbon is cracked by the heat from the hot regeneration gas, it forms a gaseous impurity component which contains hydrogen and at least one of the halogens, such as chloride or fluoride.

The invention, together with further features and advantages thereof, may best be understood by reference to the following description taken in connection with the accompanying illustrative drawing.

DESCRIPTION OF THE PREFERRED EMBODIMENT

Figure 1:
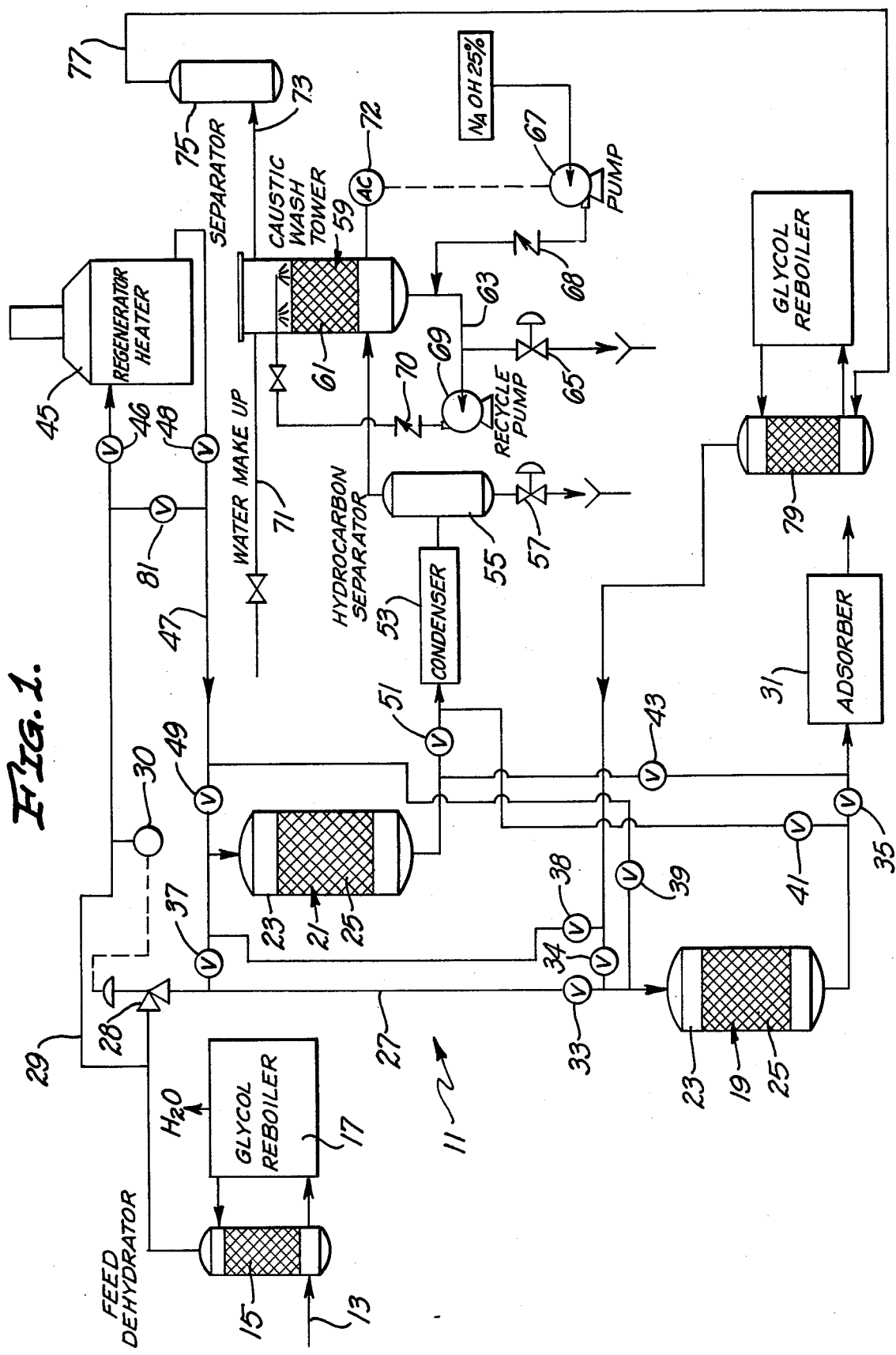
FIG. 1 is a schematic diagram of an illustrative open-loop system for carrying out a process in accordance with the teachings of this invention.

FIG. 1 shows an open-loop adsorption system 11 which is adapted to receive a fluid stream through an inlet conduit 13. The fluid stream includes water, a product fluid and an impurity. The material described as "impurity" is not limited to a common definition of the term which describes something unwanted and to be discarded. In other words, once the impurity is removed from the fluid stream, it may be saved for use and/or sale or it may be discarded as waste material.

The product fluid is the non-adsorbed fluid in the fluid stream. The product is not necessarily the component or components of the fluid stream which are desirable or sought after in the purification process.

The adsorption system 11 is particularly adapted for use with a fluid stream which is derived from a sanitary landfill, i.e., a landfill gas and/or resource recovery gas, digestor gas, or solid waste recovery system gas. For example, sanitary landfills provide fluids which comprise methane, water, carbon dioxide, chlorinated hydrocarbons and other components. By way of example and not by way of limitation, the landfill gas may have the following composition:

TABLE I

| Component | Percent By Volume On a Dry Basis |
| --- | --- |
| Air | .9839 |
| Methane | 57.0268 |
| Carbon Dioxide | 41.3011 |
| Hydrogen Sulfide | .0001 |
| Carbonyl Sulfide | .0095 |
| Methylene Chloride | .0165 |
| Trichloroethylene | .0068 |
| Perchloroethylene | .0034 |
| Chlorobenzene | .0020 |

TABLE I-continued

| Component | Percent By Volume On a Dry Basis |
| --- | --- |
| Benzene | .0497 |
| Toluene | .0211 |
| Xylene | .0535 |
| Propane and heavier | .5256 |

Of course, the landfill gas may also contain small amounts of othe halogenated hydrocarbons, such as various fluorinated hydrocarbons. In the process described hereinbelow, the product fluid is the methane alone or in combination with any of the above constituents other than significant amounts of water and chlorinated hydrocarbons.

To remove the water from the landfill gas, the landfill gas is introduced into a conventional triethylene glycol dehydrator 15. For example, the landfill gas may be saturated and contain about 400 pounds of water per million standard cubic feet of gas and the landfill gas may have been previously compressed and enter the dehydrator 15 at about 75 p.s.i.a. and about 100 degrees F. and be discharged from the dehydrator 15 at about 72 p.s.i.a. and 100 degrees F. In this manner, the water is removed from the landfill gas to provide dehydrated landfill gas at the outlet of the dehydrator 15. Sufficient water is removed in the dehydrator 15 so that no water is adsorbed in the subsequent adsorption steps described hereinbelow. By way of example, the dehydrated landfill gas may contain approximately 15 pounds per million standard cubic feet of gas. The dehydrator 15 includes the usual glycol reboiler 17 which boils off the water absorbed by the glycol and discharges such water in the usual manner.

The adsorption system 11 includes identical adsorption zones 19 and 21. Each of the adsorption zones 19 and 21 includes an upright tower 23 packed with adsorbent material 25. The adsorbent material 25 should be capable of selectively adsorbing at least one of the impurities. With reference to the landfill gas set out in Table I above, the adsorbent material 25 should be capable of selectively adsorbing at least portions of all of the components, except carbon dioxide and methane. Of course, the adsorbent material 25 may also adsorb the carbon dioxide; however, it is assumed for the purpose of this illustrative example that the carbon dioxide is not adsorbed in the adsorbent material 25.

For example, the adsorbent material 25 may be charcoal, activated alumina, silica gel or natural or synthetic molecular sieves. Of course, the particular adsorbent material utilized will depend upon the components which it is desired to adsorb and desorb. The examples of adsorbent material referred to above are given solely by way of illustration.

With reference to the landfill gas composition set forth in Table I above, it is particularly important to remove the chlorinated hydrocarbons by adsorption. Charcoal is the preferred adsorbent material for this purpose.

For the purposes of this invention, the number of the adsorption zones is not important. In the embodiment illustrated, two adsorption zones, 19 and 21, are illustrated, and they are used as pretreating zones. Although the cycling of the adsorption zones 19 and 21 can be carried out in different ways, in the embodiment illustrated, the adsorption zone 19 is on stream while the adsorption zone 21 is being thermally regenerated.

A portion of the dehydrated landfill gas discharged from the dehydrator 15 passes through a conduit 27 to the inlet to the adsorption zone 19 which is on stream. Another portion of the dehydrated landfill gas passes through a conduit 29 and is used for thermal regeneration as described hereinbelow. A flow controller 30 measures the fluid flow in the conduit 29 and adjusts a valve 28 to appropriately apportion the dehydrated landfill gas between the conduits 27 and 29. In addition, the valve 28 interposes a resistance to flow of the landfill gas in the conduit 27 and creates, for example, a 10 p.s.i. pressure drop so that the landfill gas discharged from the valve 28 may be at about 62 p.s.i.a. and about 100 degrees F.

As the dehydrated landfill gas passes through the adsorbent material 25 of the adsorption zone 19, impurity is adsorbed on the material 25. For example, with the landfill gas of Table I supplied in dehydrated form to charcoal adsorbent in the adsorption zone 21, portions of the hydrogen sulfide, carbonyl sulfide, methylene chloride are adsorbed, all hydrocarbons as heavy or heavier than butane are adsorbed, and substantially all of the other components, except methane and carbon dioxide, are adsorbed.

The fluid stream discharged from the outlet of the adsorption zone 19 consists essentially of methane, carbon dioxide, and some trace amounts of other impurity not adsorbed on the adsorbent material 25. The fluid stream discharged from the adsorption zone 19 may be considered as the product fluid in that at least some of the impurity has been removed from the landfill gas. Although this fluid stream may be used directly, in the embodiment illustrated, it is passed through an adsorber 31 which adsorbs the carbon dioxide and may adsorb some of the trace impurities, if they are present, to provide at the outlet of the adsorber a product fluid consisting essentially of methane. For example, the portion of the system 11 represented schematically by the adsorber 31 may be as described in Bingham U.S. Pat. No. 4,000,990 for carbon dioxide removal.

The adsorption system 11 includes a suitable number and arrangement of valves to permit the adsorption zones 19 and 21 to be cycled between on stream and regeneration modes as desired. For example, with the adsorption zone 19 on stream, valves 33, 34 and 35 are open, and valves 37, 38, 39, 41 and 43 are closed.

For thermal regeneration purposes, the adsorption system 11 includes a regenerator heater 45 which receives dehydrated landfill gas from the conduit 29 through an open valve 46. The heater 45 heats the landfill gas to a temperature sufficient for thermal regeneration which may be of the order of 710 degrees F. and 69 p.s.i.a. The hot regeneration gas from the heater 45 is supplied through a conduit 47 and open valves 48 and 49 to the off-stream adsorption zone 21. Although the hot regeneration gas may be passed through the adsorption zone 21 either co-currently or countercurrently, in the embodiment illustrated, it is passed through co-currently, i.e., in the same direction as the landfill gas passes through the adsorption zone 21 when the latter is on stream for adsorption. The hot regeneration gas is sufficiently hot to heat the adsorbent material 25 and to desorb the adsorbed impurity on the adsorbent material 25. As the temperature of the chlorinated hydrocarbons reaches 250 degrees F., some of the components start to crack to form hydrogen chloride gas. Consequently, the desorbate in the regeneration gas contains hydrocarbons and a high concentration of hydrogen chloride gas. Of course, any other halogenated hydrocarbons contained in the desorbate will also be cracked to form a gaseous impurity component containing hydrogen and at least one of the halogens, such as chloride or fluoride.

The regeneration gas with the desorbate then passes through a valve 51 to a condenser 53. The regeneration gas, including the desorbate, is cooled in the condenser 53 to condense and remove essentially all of the hydrocarbons heavier than butanes. These condensed hydrocarbons are separated from the regeneration gas in a conventional hydrocarbon separator 55. The condensed hydrocarbons are drained from the bottom of the separator 55 through a valve 57 and may be used as a by-product or disposed of as desired.

The regeneration gas stream with the hydrogen chloride therein then flows to a caustic wash tower 59. The regeneration gas is introduced into the bottom of the caustic wash tower 59, and a dilute aqueous caustic solution is continuously introduced into the top of the tower. The caustic in the solution may be, for example, sodium hydroxide. The caustic solution flows through a packed bed of noncorrosive material 61 within the tower 59 and reacts with the hydrogen chloride gas to form sodium chloride. As sodium chloride is soluble in water, it is dissolved in the solution and can be drained from the system through a conduit 63 and a valve 65. Other desorbed impurities are also removed in the caustic wash tower 59.

Although various arrangements are possible, in the embodiment illustrated, a pump 67 injects a 25% sodium hydroxide solution through a check valve 68 into the conduit 63, and the sodium hydroxide solution is pumped through a check valve 70 to the top of the tower 59 along with the recycled solution from the tower by a recycle pump 69. To prevent a build-up of sodium chloride solids, water makeup is continuously added to the top of the tower 59 via a conduit 71, and this allows the solution to be continuously drained through the valve 65 to remove the sodium chloride. The pH of the solution below the bed in the caustic wash tower 59 is controlled by a pH controller 72 which controls the pump 67 as required so that the injection of sodium hydroxide can be varied to control and maintain the acidity within the tower 59.

The regeneration gas stream leaves the upper end of the tower 59 and enters a conduit 73. The regeneration gas in the conduit 73 is essentially free of hydrogen chloride but is saturated with water. A conventional water separator 75 removes the entrianed liquids from the regeneration gas, and so the regeneration gas leaving the separator 75 and entering the conduit 77 does not contain free liquids. Thus, the regeneration gas introduced into the conduit 77 consists essentially of saturated landfill gas having a makeup similar to the landfill gas introduced into the dehydrator 15 from the conduit 13, except the the majority of impurities other than carbon dioxide are removed. In order to permit this landfill gas to be used, the water should be removed before it is passed through an adsorbent. To accomplish this, the gas stream is passed through a dehydrator 79 which is similar to the glycol dehydrator 15. This removes the water vapor and dehydrates the gas stream in the same manner and to the same extent as the dehydrator 15. Next, the dehydrated gas stream is introduced into the inlet of the adsorption zone 19 and to the adsorber 31 where the impurities therein are removed as described above.

The hot regeneration gas is passed through the adsorption zone 21 until substantially all of the impurity adsorbed on the adsorbent material 25 of the zone 21 is removed. Thereafter, the adsorption zone 21 is cooled. Although the cooling may be carried out in different ways, in the embodiment illustrated, this is accomplished by passing the dehydrated landfill gas from the conduit 29 through a valve 81 and the conduit 47 to the adsorption zone 21. During the cooling cycle, the valves 46 and 48 are closed to isolate the regenerator heater 45. Of course, the valve 81 is closed during the time that the hot gas from the regenerator heater 45 is being passed through the adsorption zone 21.

The gas stream used for cooling the adsorption zone 21 passes through the condenser 53, the separator 55, the tower 59, the separator 75 and the dehydrator 79 in the manner described above. The cooling gas is passed through the adsorption zone 21 until the temperature of this gas at the outlet of the adsorption zone reaches the desired level which may be, for example, about 180 degrees F.

It should be noted that the high temperature of the dehydrated landfill gas in the regenerator heater 45 cracks the chlorinated hydrocarbons to form hydrogen chloride. However, the regeneration gas is too hot when it passes through the adsorption zone 21 for the impurities to be adsorbed onto the adsorbent material 25. Similarly, the dehydrated landfill gas used in the cooling cycle contains chlorinated hydrocarbons which are also cracked by the heat added to this gas in the adsorption zone 21. Here again, the temperature is too high for adsorption of the hydrogen chloride onto the adsorbent material 25. So long as the adsorbent material 25 is hot enough to crack the chlorinated hydrocarbons in the cooling gas, no adsorption of the hydrogen chloride gas can occur. The passage of the cooling gas through the adsorption zone 21 is terminated by shutting off the valve 81 prior to the time that any substantial amount of adsorption of the components of the cooling gas onto the adsorbent material of the zone 21 occurs.

As the adsorption zone 19 approaches saturation, the valves 33, 34 and 35 are closed, and the valves 39 and 41 are opened to take the adsorption zone off stream and to begin the thermal regeneration process. Similarly, to place the adsorption zone 21 on stream, the valves 49 and 51 are closed, and the valves 37, 38 and 43 are opened. When the adsorption zone 21 is on stream, the dehydrated regeneration gas from the dehydrator 79 passes through the valve 38 to the inlet of the adsorption zone 21.

Figure 2:
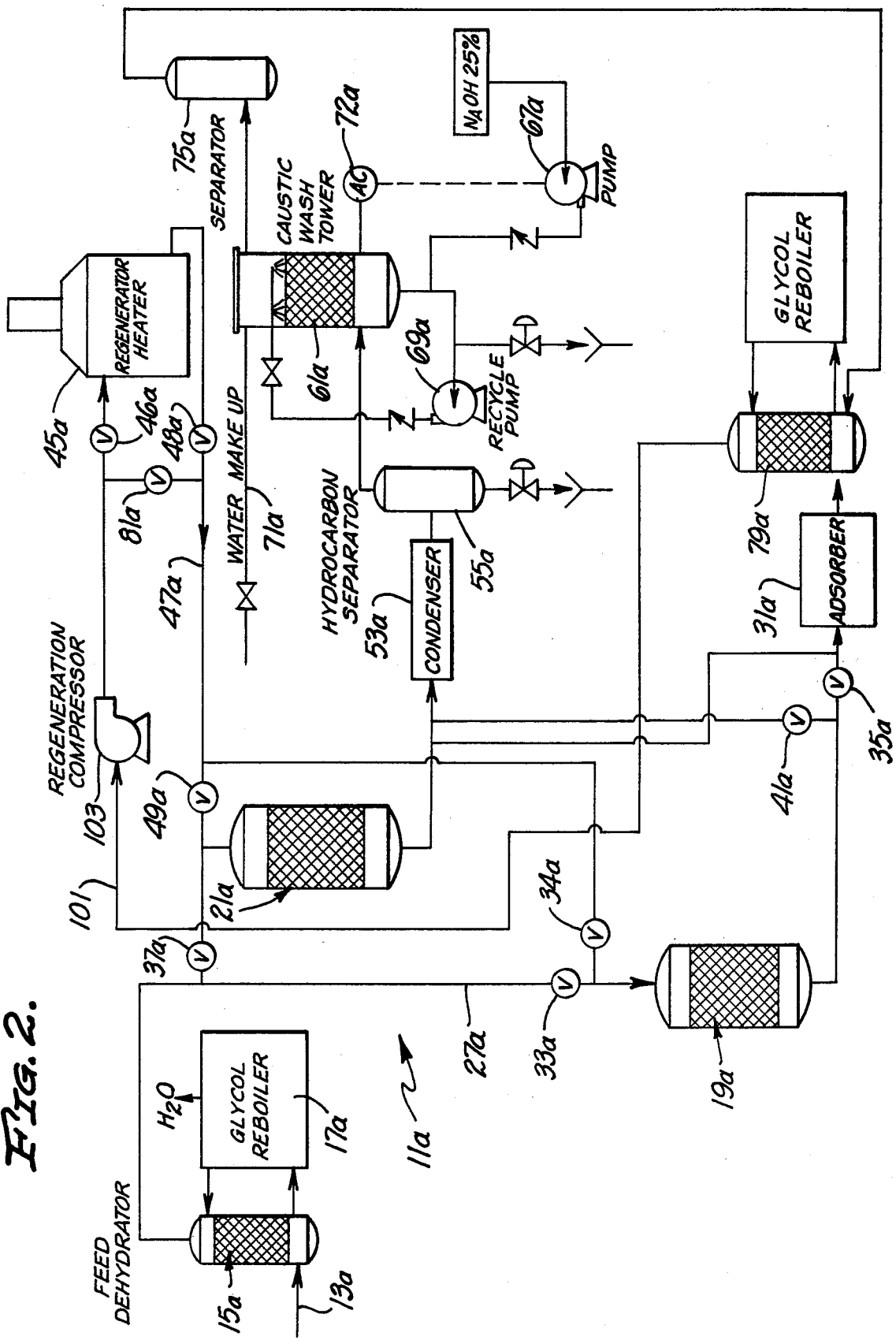
FIG. 2 is a schematic diagram of an illustrative closed-loop system for carrying out a process in accordance with the teachings of this invention.

FIG. 2 shows a closed-loop adsorption system 11a which is identical to the open-loop system 11 in all respects not shown or described herein. Portions of the adsorption system 11a corresponding to portions of the adsorption system 11 are designated by corresponding reference numerals followed by the letter "a."

In the closed-loop system 11a, the regeneration gas continuously circulates in a closed circuit through a heater 45a, condenser 53a, separators 55a and 75a, caustic wash tower 59a and dehydrator 79a. However, the adsorption system 11a does not hav a conduit corresponding to the conduit 29 of the adsorption system 11. Rather, the adsorption system 11a has a conduit 101 which extends from the input of a regeneration compressor 103 to the dehydrator 79a. The regeneration compressor 103 pumps the regeneration gas and compresses it to about 60 p.s.i.a. before it enters the regenerator heater 45a. Also, the valves 34 and 38 and the associated conduits of the open-loop system 11 (FIG. 1) are eliminated in the closed-loop system 11a. The regeneration gas of the closed-loop system 11a may be at about 10 p.s.i.a., less pressure than the regeneration gas of the open-loop system 11. Dehydrated landfill gas may be used as the regeneration gas and appropriate amounts of landfill gas are supplied to the closed circuit as makeup based upon pressure differential through valve 41a.

Although exemplary embodiments of the invention have been shown and described, many changes, modifications and substitutions may be made by one having ordinary skill in the art without necessarily departing from the spirit and scope of this invention.

We claim:

1. A corrosion control process for a gaseous stream which contains water, an impurity, and a product gas wherein the impurity includes a halogenated hydrocarbon, said process comprising:

removing water from the gaseous stream to provide a substantially dehydrated gaseous stream;

introducing the dehydrated gaseous stream to an adsorption zone to adsorb at least some of the halogenated hydrocarbon of the impurity from the dehydrated gaseous stream to provide a nonadsorbed component which includes the product gas;

said step of removing water including removing a sufficient amount of the water so that substantially no water is adsorbed from the dehydrated gaseous stream in said adsorption zone;

terminating said step of introducing;

passing a hot regeneration gas through the adsorption zone to remove the adsorbed halogenated hydrocarbon from the adsorption zone to thereby thermally regenerate the adsorption zone with the heat from the hot regeneration gas cracking the halogenated hydrocarbon to produce a gaseous impurity component containing hydrogen and at least one halogen; and removing the gaseous impurity component from the regeneration gas;

thereby, substantially preventing corrosion as a result of the cracking of the halogenated hydrocarbon.

2. A process as defined in claim 1 wherein said halogenated hydrocarbon includes a chlorinated hydrocarbon and the hot regeneration gas heats the chlorinated hydrocarbon sufficiently to crack the chlorinated hydrocarbon to form hydrogen chloride gas whereby said gaseous impurity component includes hydrogen chloride gas.

3. A process as defined in claim 1 wherein said gaseous stream is landfill gas, said product gas includes methane, and said halogenated hydrocarbon includes a chlorinated hydrocarbon, said hot regeneration gas heats the chlorinated hydrocarbon sufficiently to crack the chlorinated hydrocarbon to form hydrogen chloride gas whereby said gaseous impurity component includes hydrogen chloride gas.

4. A process as defined in claim 1 wherein said step of removing water includes introducing the gaseous stream to a glycol dehydrator to remove substantially all of the water from the gaseous stream.

5. A process as defined in claim 1 wherein said step of removing the water is carried out without adsorbing the water.

6. A process as defined in claim 1 wherein said regeneration gas includes said product gas and an impurity, said process includes adsorbing the last-mentioned impurity from the regeneration gas subsequent to the removal of the gaseous impurity component to provide a fluid stream which includes the product gas.

7. A process as defined in claim 1 wherein said product gas provided in said step of introducing includes at least first and second components, said process includes adsorbing said first component from the product gas subsequent to said step of introducing to provide a product gas consisting essentially of the second component.

8. A process as defined in claim 1 wherein said step of removing the gaseous impurity component includes adding a caustic to said gaseous impurity component.

9. A process as defined in claim 1 wherein said step of removing the gaseous impurity component includes introducing the gaseous impurity component to a caustic wash zone, contacting the gaseous impurity component with a caustic to form a soluble salt, introducing water to said caustic wash zone to wash the soluable salt out of the caustic wash zone.

10. A process as defined in claim 1 wherein said step of removing the water includes introducing the gaseous stream to a glycol dehydrator and said step of removing the gaseous impurity component includes adding a caustic to said gaseous impurity component.

11. A process as defined in claim 1 including withdrawing the gaseous stream from a landfill whereby the gaseous stream is landfill gas and wherein the product gas includes methane.

12. A corrosion control process for a landfill gas which contains water, an impurity, and methane wherein the impurity includes a first component and a chlorinated hydrocarbon, said process comprising:

providing at least first and second adsorption zones each of which has an inlet and an outlet and includes adsorbent material capable of selectively adsorbing the chlorinated hydrocarbon;

removing at least some of the water from the landfill gas to provide substantially dehydrated landfill gas;

introducing the dehydrated landfill gas into the inlet of the first adsorption zone and contacting the dehydrated landfill gas with the adsorbent material of the first adsorption zone to adsorb the chlorinated hydrocarbon to provide a gas stream containing methane and said first component of the impurity;

said step of removing water including removing a sufficient amount of water from the landfill gas so that substantially no water is adsorbed from the landfill gas in said first adsorption zone;

discharging the gas stream containing methane and the first component of the impurity from the outlet of said first adsorption zone;

terminating the introduction of the dehydrated landfill gas into the inlet of the first adsorption zone;

introducing the dehydrated landfill gas into the inlet of the second adsorption zone to adsorb the chlorinated hydrocarbon in the adsorbent material of the second adsorption zone to provide a gas stream containing methane and said first component of the impurity;

discharging the gas stream containing methane and the first component of the impurity from the outlet of the second adsorption zone;

passing a hot regeneration gas through the first adsorption zone during at least a portion of the time that the introduction of the dehydrated gas stream to the inlet of said first adsorption zone is terminated, the hot regeneration gas desorbing the chlorinated hydrocarbon to thermally regenerate the first adsorption zone with the heat from the hot regeneration gas cracking at least some of the chlorinated hydrocarbon to provide hydrogen chloride gas; and removing the hydrogen chloride gas from the regeneration gas at a location outside of the first adsorption zone;

thereby, substantially preventing corrosion as a result of the cracking of the chlorinated hydrocarbon.

13. A process as defined in claim 12 including providing a third adsorption zone having adsorbent material capable of selectively adsorbing the first component of the impurity from the gas stream and passing the gas stream containing methane and said first component of the impurity through said third adsorption zone to adsorb the first component of the impurity on the adsorbent material of the third adsorption zone to provide a gas stream containing a higher portion of methane.

14. A process as defined in claim 12 wherein said step of removing at least some of the water is carried out without adsorbing the water.

15. A process as defined in claim 12 wherein said process includes providing a caustic wash zone, introducing the hydrogen chloride gas and a caustic solution to the caustic wash zone to remove the hydrogen chloride gas.

16. A process as defined in claim 12 including heating a portion of the dehydrated landfill gas to provide at least a portion of said hot regeneration gas, said step of removing the hydrogen chloride gas from the regeneration gas includes contacting the regeneration gas with an aqueous caustic solution to remove the hydrogen chloride gas from the regeneration gas and to add water to the regeneration gas, removing at least some of the water from the regeneration gas and introducing the regeneration gas to the inlet of the second adsorption zone.

17. A process as defined in claim 12 wherein said step of removing the hydrogen chloride from the regenerating gas includes contacting the regeneration gas with an aqueous caustic solution to remove the hydrogen chloride gas and to add water to the regeneration gas, said process including removing substantially all of the water from the regeneration gas to provide a dehydrated regeneration gas and reusing the dehydrated regeneration gas for thermal regeneration of at least one of said first and second adsorption zones.

* * * * *